US 8,174,850 B2

(12) United States Patent
Adragna et al.

(10) Patent No.: US 8,174,850 B2
(45) Date of Patent: May 8, 2012

(54) METHOD AND CIRCUIT FOR AVOIDING HARD SWITCHING IN HALF BRIDGE CONVERTERS

(75) Inventors: Claudio Adragna, Monza (IT); Silvio De Simone, Busto Arsizio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 477 days.

(21) Appl. No.: 12/421,135

(22) Filed: Apr. 9, 2009

(65) Prior Publication Data

US 2010/0259951 A1    Oct. 14, 2010

(51) Int. Cl.
*H02M 3/335*    (2006.01)
*H02M 3/24*    (2006.01)
(52) U.S. Cl. ............................................ 363/17; 363/98
(58) Field of Classification Search .................... 363/16, 363/17, 21.02, 21.03, 97, 98, 131, 132
See application file for complete search history.

(56) References Cited

U.S. PATENT DOCUMENTS

| | | | |
|---|---|---|---|
| 7,110,269 B2 * | 9/2006 | Cao et al. | 363/21.03 |
| 7,688,600 B2 * | 3/2010 | Sauerlander et al. | 363/17 |
| 7,948,775 B2 * | 5/2011 | Lu | 363/17 |
| 2009/0207635 A1 * | 8/2009 | Elferich | 363/21.03 |

* cited by examiner

*Primary Examiner* — Matthew Nguyen
(74) *Attorney, Agent, or Firm* — Seed IP Law Group PLLC

(57) ABSTRACT

A half bridge switching dc-dc converter an input dc voltage to an output dc voltage. The converter includes a switching circuit for receiving the input dc voltage and generating a periodic square wave voltage oscillating from a high value corresponding to the input dc voltage to a low value corresponding to a reference voltage. The periodic square wave voltage oscillates at a main frequency with a main duty cycle equal to about 50% when the converter operates in a steady state. The converter further includes a conversion circuit for providing the output dc voltage from the square wave voltage based on the main frequency and on the main duty cycle. The converter still further comprises a switching control circuit controlling the switching circuit for temporarily varying the main duty cycle during at least one period of the square wave after a power on of the converter.

31 Claims, 7 Drawing Sheets

METHOD AND CIRCUIT FOR AVOIDING HARD SWITCHING IN HALF BRIDGE CONVERTERS

BACKGROUND

1. Technical Field

The solution according to the present disclosure relates to the electronic field. Particularly, such solution concerns switching direct current-direct current (dc-dc) converters.

2. Description of the Related Art

In electronics, a dc-dc converter is an electronic circuit adapted to convert a dc source from a voltage value to another one. An important application field of the dc-dc converters regards the electronic systems supplied through the power grid. Particularly, such electronic systems generally comprise a supply circuit capable of generating a dc voltage by rectifying the (alternating) voltage provided by the power grid; however, a generic electronic system is typically formed by a plurality of sub-circuits, each needing a different supply voltage value. The presence of one or more dc-dc converters allows to locally generate said different supply voltage values starting from the one generated by the supply circuit.

Among the various dc-dc converters presently available on the market, a well-know class thereof is represented by the so-called switching dc-dc converters. A switching dc-dc converter includes one or more switching elements (such as power MOS transistors) which are properly switched for generating a square wave starting from the supply voltage generated by the supply circuit.

Making reference to the switching dc-dc converters implemented according to the so-called half bridge configuration (briefly referred to as half-bridge converters), the switching elements include a high-side transistor and a low-side transistor connected in series between the supply circuit providing the supply voltage to be converted and a terminal providing a reference voltage, such as ground. By properly switching said two transistors it is possible to generate a square wave having a high value (assumed when the high-side transistor is activated) corresponding to the supply voltage and a low value (assumed when the low-side transistor is activated) corresponding to the ground.

Said square wave is provided to the primary winding of a transformer through a dc blocking capacitor; the secondary winding of said transformer feeds a rectifier circuit and a filter circuit for providing an output dc voltage. The value of the output dc voltage depends on the frequency and/or the duty cycle with which the switching elements are switched.

The switching frequency of the switching elements is significantly higher than that of the alternating voltage provided by the power grid. Therefore, the transformer included in a half-bridge converter can have a smaller size with respect to that of a transformer designed to be directly fed by the power grid. Moreover, a half-bridge converter is characterized by high efficiency, and low generation of heat.

However, while operating at higher frequencies allows a considerable reduction in the size of the passive components included in a half-bridge converter—such as the transformers and the filters—, a high switching frequency entails an increase of the so-called driving losses and of the so-called switching losses. While the driving losses are caused by the electrical power used for switching the switching elements, there are two different types of switching losses. A first type of switching loss is given by the passage of current through the switching elements occurring during the switching thereof; indeed, since the switching is not instantaneous, during a short period of time each switching element is crossed by a current when a voltage difference is developed across its terminal. The second type of switching loss is caused by the parasitic capacitance associated with each switching element, which discharges on the resistance of the switching element itself while the latter is activated. Both the driving and the switching losses are proportional to the frequency with which the switching elements are commuted. The switching losses become particularly noticeable in case it is necessary to provide electric charge for turning on a switching element implemented with a power MOS transistor that has a high drain to source voltage ("hard switching" condition).

To reduce the switching losses and allow high frequency operation, resonant conversion techniques have been widely developed. These techniques provides for processing electrical power in a sinusoidal manner, and controlling the switching elements in such a way to limit the occurrence of hard switching.

A half-bridge converter that exploits a resonant technique, referred to as resonant half-bridge converter, is provided with an input resonant network coupled with the primary winding of the transformer, in such a way that the network formed by the input resonant network and the primary winding of the transformer acts as a resonant tank.

Among the various known topologies of half-bridge converters exploiting a resonant technique, the so-called LLC topology is especially suited for those applications in which the value of the dc voltage to be converted is particularly high, i.e., in a condition favorable for the occurrence of high switching losses. The input resonant network of an LLC half-bridge converter is formed by a series LC circuit connected between the switching elements and an input of the primary winding of the transformer, and a shunt inductor connected across both the inputs of the primary winding; the series LC circuit may be implemented by connecting a series inductor to the dc blocking capacitor of the converter.

With an LLC half-bridge converter, it is possible to adjust the value of the output dc voltage over wide load and input dc voltage variations with a relatively small variation of the switching frequency. Moreover, the LLC topology allows to achieve a Zero Voltage Switching (ZVS) condition—wherein the power MOS transistors forming the switching elements switch at a nearly zero drain to source voltage—with ease. Particularly, by properly designing the input resonant network in such a way that the impedance's reactive component of the resonant tank is inductive for a sufficiently large switching frequency range, the current flowing into the resonant tank lags the voltage square wave generated by the switching elements.

In detail, during each falling edge of the square wave—and particularly at the time the low-side transistor is switched on—, said current is sunk by the resonant tank, while, during each rising edge of the square wave—and particularly at the time the high-side transistor is switched on—, said current is sourced by the resonant tank. As a consequence, every time the high-side transistor or the low-side transistor have to switch on, the drain to source parasitic capacitances associated therewith are already charged/discharge by the current output/sunk by the resonant tank, strongly favoring the occurrence of the ZVS condition.

It has to be appreciated that the resonant behavior can be also achieved without the presence of a dedicated input resonant network. Indeed, considering that the half-bridge converter already comprises a capacitor (i.e., the dc blocking capacitor), instead of providing dedicated series and shunt inductors, similar results can be achieved by substituting one or both of said inductors with corresponding parasitic inductances of a proper designed transformer (in this case, the transformer is referred to as "resonant transformer").

The half-bridge converters are affected by a quite serious drawback occurring during the start up. Particularly, in the steady state, the voltage across the terminals of the capacitor included in the input resonant network comprises a dc component, corresponding to about half the supply voltage provided by the supply circuit, and an ac component that follows the course in time of the square wave. Since the capacitor blocks the dc component of such voltage, the voltage across the primary winding of the transformer exhibits the ac component only; as a consequence, in the steady state, the value of the magnetic flux linking the primary winding with the secondary winding of the transformer oscillates within a symmetrical range defined by such ac component only. On the contrary, at the start up of the converter, the capacitor is discharged; thus, when the high-side transistor switches on for the first time, the voltage seen by the primary winding performs a wide transition, from the ground to the high value of the square wave, i.e., the supply voltage generated by the supply circuit. As a consequence, the transformer works in the so-called "flux doubling" condition, with the magnetic flux that oscillates within a non-symmetrical range. This is a disadvantageous condition, which causes an asymmetry in the current sourced/sunk by the resonant tank. Particularly, since at the start-up the capacitor is completely discharged, when the high-side transistor is turned on for the first time, the current flowing into the resonant tank increases more rapidly than it decreases when the low-side transistor is turned on. As a consequence, when the high-side transistor is turned on at the subsequent cycle, the current is still positive, i.e., being still sunk by the resonant tank. In this condition, the high-side transistor is switched on in a hard switching condition, with the body diode of the high-side transistor that is crossed by current when the low-side transistor is turned on. As a consequence, the high-side and the low-side transistors are conductive at the same time, short-circuiting the terminal providing the supply voltage to be converted with the terminal providing the ground voltage. In this condition, a high peak of current is generated, which wastes a high amount of power. More importantly, in response to said high peak of current, the voltages across the terminals of the transistors may rapidly vary at a rate such to trigger the parasitic SCRs associated therewith.

BRIEF SUMMARY

One embodiment avoids (or at least reduces) any occurrence of hard switching during the start up operation of a half bridge converter.

Particularly, according to one embodiment, a half bridge switching dc-dc converter for converting an input dc voltage to an output dc voltage is provided. The converter includes a switching circuit for receiving the input dc voltage and generating a periodic square wave voltage oscillating from a high value corresponding to the input dc voltage to a low value corresponding to a reference voltage. The periodic square wave oscillates at a main frequency with a main duty cycle. The value of the main duty cycle is equal to about 50% when the converter operates in a steady state. The converter further includes a conversion circuit for providing the output dc voltage from the square wave voltage based on the main frequency and on the main duty cycle. The conversion circuit includes a dc blocking capacitor for receiving the square wave voltage. The converter still further comprises a switching control circuit controlling the switching circuit for temporarily varying the main duty cycle during at least one period of the square wave after a power on of the converter.

Another embodiment regards a switching control circuit for a half bridge switching dc-dc converter.

A still further embodiment provides for a method of operating a half bridge switching dc-dc converter.

BRIEF DESCRIPTION OF THE SEVERAL VIEWS OF THE DRAWINGS

Certain embodiments of, as well as further features and advantages thereof will be best understood by reference to the following detailed description, given purely by way of a non-restrictive indication, to be read in conjunction with the accompanying drawings. Particularly.

DETAILED DESCRIPTION

In the following, a solution according to exemplary and non-limitative embodiments will be presented and described in detail. Those skilled in the art will however recognize that several modifications to the described embodiments are possible, and that the present invention can be embodied in different ways.

Figure 1:
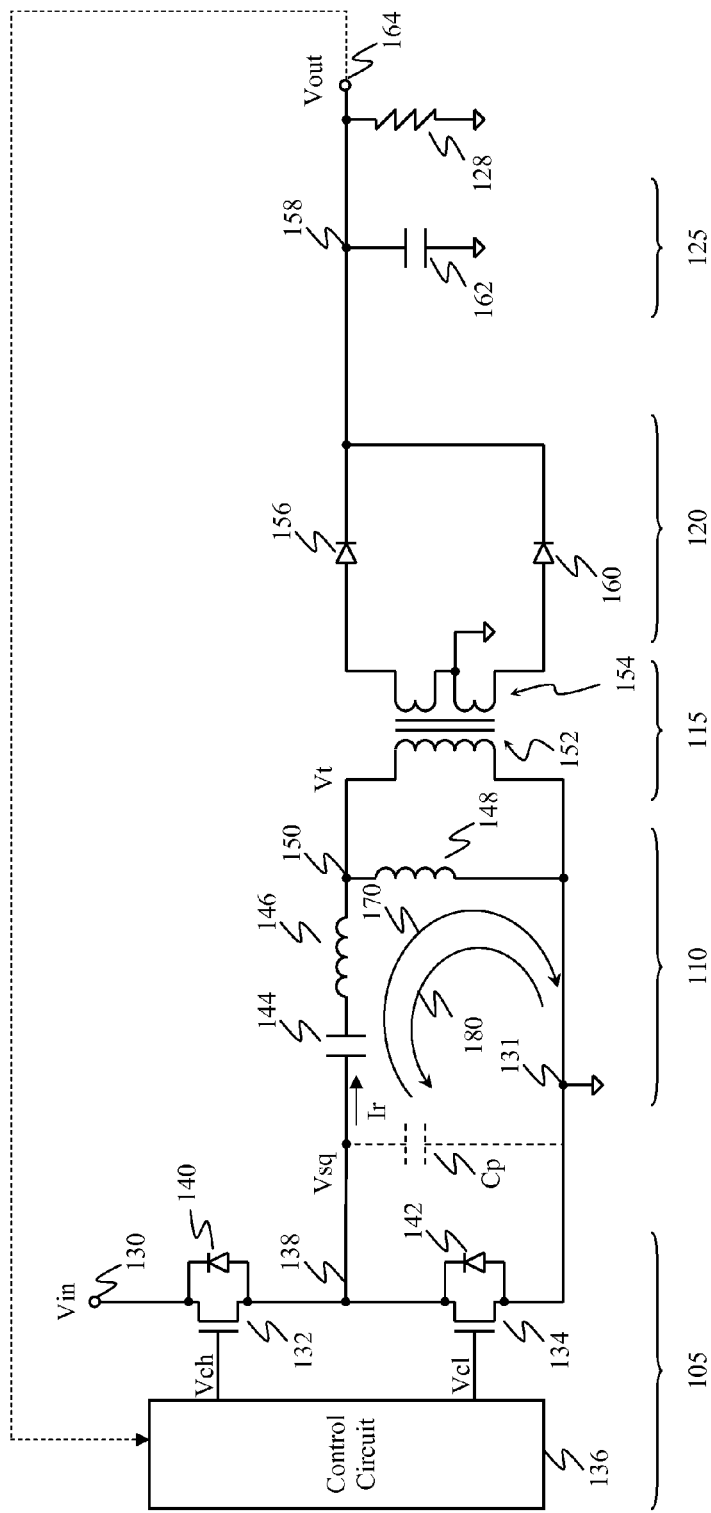
FIG. 1 illustrates a half-bridge converter according to one embodiment.

With reference in particular to FIG. 1, a switching dc-dc converter according to one embodiment is illustrated with the reference 100. The converter 100 illustrated in FIG. 1 is an LLC half-bridge converter provided with a dc blocking capacitor; however, it has to be appreciated that similar considerations apply to different topologies, including LC, LCC and plain half-bridge topologies provided with a dc blocking capacitor.

The converter 100 includes five main sections cascade connected, and particularly a square wave generator 105, an input resonant network 110, a transformer 115, a rectifier 120 and a filter 125.

The converter 100 receives an input dc voltage Vin to be converted, and provides a corresponding converted output dc voltage Vout. For example, the input dc voltage may be generated by a supply circuit (not shown) from an ac voltage provided by the main power grid. The converted output voltage Vout is provided to a generic load schematically represented by a resistor 128.

The square wave generator includes two switching elements connected in series between an input terminal 130 receiving the input dc voltage Vin and a reference node 131 coupled with a terminal providing a reference voltage, referred to as ground. Particularly, the switching elements comprise a high-side transistor 132 (e.g., an n-channel power MOS transistor) and a low-side transistor 134 (e.g., another n-channel power MOS transistor). The high-side transistor 132 includes a drain terminal coupled with the input terminal for receiving the input dc voltage Vin, a gate terminal coupled with a switching control circuit 136 for receiving a control signal Vch, and a source terminal connected to a drain terminal of the low-side transistor 134 (circuit node 138). The low-side transistor 134 includes a gate terminal coupled with the switching control circuit 136 for receiving a control signal Vcl and a source terminal connected with the reference node 131. Both the high-side and low-side transistors 132 and 134 are depicted in FIG. 1 with their body diodes. Particularly, the high-side transistor 132 comprises a body diode identified with the reference 140, which is coupled between the source terminal (anode) and the drain terminal (cathode) thereof; similarly, the low-side transistor 134 comprises a body diode 142 coupled between the source terminal (anode) and the drain terminal (cathode).

The input resonant network 110 comprises a dc blocking capacitor 144 having a first terminal connected to the circuit node 138 and a second terminal connected to a first terminal of a (series) inductor 146. The inductor 146 has a second terminal connected to a first terminal of a further (shunt) inductor 148 (circuit node 150); the inductor 148 has a second terminal connected to the reference node 131. Similar considerations apply in case one or both of the inductors 146 and 148 are replaced by parasitic inductances that are intrinsic to the transformer 115.

The transformer 115 includes a primary winding 152 having a first terminal connected to the circuit node 150 and a second terminal connected to the reference node 131. The transformer 115 further comprises a center-taped secondary winding 154, having a first and a second terminals connected to the rectifier 120 and a center tap connected to a terminal providing the ground voltage.

The rectifier 120 comprises a diode 156 having a first terminal (anode) connected to the first terminal of the secondary winding 154 and a second terminal (cathode) connected to the filter 125 (circuit node 158). The rectifier 120 comprises a further diode 160 having a first terminal (anode) connected to the second terminal of the secondary winding 154 and a second terminal (cathode) connected to the circuit node 158.

The filter 125 is schematically represented in FIG. 1 by a capacitor 162 having a first terminal connected to the circuit node 158 and a second terminal connected to a terminal providing the ground voltage.

The circuit node 158 is connected to the output terminal of the converter 100—identified in the figure with the reference 164—for providing the converted output voltage Vout to the load 128.

Without entering into details well known to those skilled in the art, the principle of the converter 100 operation will be described in the following.

Figure 2:
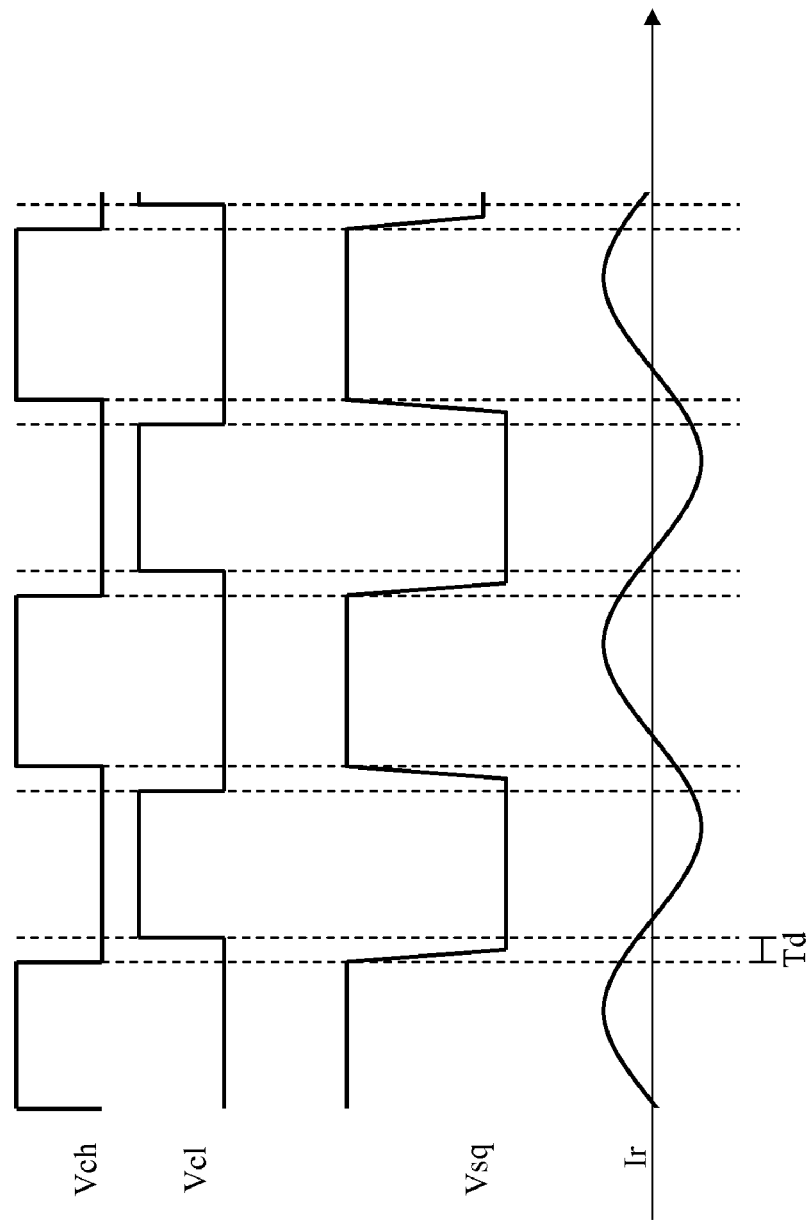
FIG. 2 illustrates an example of how some signals of the converter illustrated in FIG. 1 evolve in time.

The switching control circuit 136 drives the high-side and low-side transistors 132, 134 in such a way to activate/deactivate them in a symmetrical way. For this purpose, the control signals Vch and Vcl generated by the switching control circuit are periodic square waves in antiphase. More particularly, as it is shown in the example illustrated in FIG. 2, the control signals Vch and Vcl are periodic square waves oscillating between a high value and a low value at a same switching frequency sf with a duty cycle (i.e., the ratio between the duration in time the control signals are at the high value and the duration in time the control signals ar at the low value) of about 50%. The control signals Vch and Vcl are in antiphase, in the sense that when one of them it is at the high value, the other one is at the low value. When the control signal Vch is at the high value and the control signal Vcl is at the low value, the high-side transistor 132 is activated, while the low-side transistor 134 is off. In this situation, the circuit node 138 is brought to the input dc voltage Vin. When instead the control signal Vcl is at the high value and the control signal Vch is at the low value, the low-side transistor 134 is activated, while the high-side transistor 132 is off. In this case, the circuit node 138 is brought to the ground voltage. As a consequence, the voltage of the circuit node 138, referred to as square input voltage and identified in the figures with the reference Vsq, is a square wave that oscillates in phase with the control signal Vch between a high value corresponding to the input dc voltage Vin and a low value corresponding to the ground voltage. By setting the duty cycle of both the control signals Vch and Vcl to about 50%, the average value of the square input voltage Vsq is equal to about half the input dc voltage Vin.

As will be more clear in the following of the present description, in order to allow the converter 100 to correctly operate in the ZVS condition for avoiding (or at least reducing) any occurrence of hard switching, both the control signals Vch and Vcl are set to the low value after each falling edge thereof for a predetermined time interval. During such predetermined time intervals, referred to as guard intervals and identified in FIG. 2 with the reference Td, both the high-side and the low-side transistors 132, 134 are turned off.

The square input voltage Vsq is applied to the terminal of the capacitor 144 connected to the circuit node 138. In the steady state, the voltage difference developed across the terminals of the capacitor 144 is formed by a dc component equal to the average value of the square input voltage Vsq plus an ac component oscillating at the switching frequency sf. Without entering into details well known to the skilled technicians, the input resonant network 110 and the primary winding 152 of the transformer 115 act as a voltage divider for such ac component; as a consequence, the amplitude of the (ac) voltage at the circuit node 150—referred to as transformer input voltage Vt—depends on the reactance of the input resonant network 110, which depends in turn by the switching frequency sf of the square input voltage Vsq. The transformer input voltage Vt applied to the primary winding 152 generates a corresponding transformed (ac) voltage across the terminals of the secondary winding 154, which amplitude depends on the transformer ratio (i.e., the ratio between the number of the primary winding turns and the secondary winding turns). Said ac voltage is rectified by the rectifier 120 and filtered by the filter 125 for obtaining a ripple-free converted output dc voltage Vout of the desired level.

By varying the switching frequency sf of the square input voltage Vsq, it is possible to regulate the value of the output dc voltage Vout. Indeed, the amplitude of the transformer input voltage Vt depends on the switching frequency sf; more importantly, the lower the switching frequency sf of the square input voltage Vsq, the higher the amount of energy that is transferred from the primary winding 152 to the secondary winding 154 during each period of the square input voltage Vsq.

For this purpose, in order to maintain the output dc voltage Vout at the desired level also in presence of load 128 variations and/or input dc voltage Vin fluctuations, the output dc voltage Vout is fed back to the switching control circuit. The switching control circuit is designed to vary the switching frequency sf of the square input voltage Vsq based on the output dc voltage Vout changes due to the load 128 variations and/or input dc voltage Vin fluctuations, and particularly by increasing the switching frequency sf when the input dc voltage Vin increases and the load 128 resistance decreases (and vice versa).

As previously cited in the present description, the capacitance of the capacitor 144 and the inductances of the inductors 146,148 are such that the reactance of the input resonant network 110 is inductive for the switching frequencies sf for which the converter 100 is designed to operate. In this way, it assured that the current flowing into the input resonant network—identified in the FIGS. 1 and 2 with the reference Ir—lags the square input voltage Vsq (and thus, the control signal Vch). This condition, together with the presence of sufficiently long guard intervals Td after each falling edge of the square input voltage Vsq, allows the high-side and low side transistors 132,134 to switch in a ZVS condition.

In greater detail, when the high-side transistor 132 is on, the square input voltage Vsq is at the input dc voltage Vin. In this condition, the parasitic capacitance associated with the circuit node 138—identified in FIG. 1 by means of a single lumped capacitor Cp, but formed by the intrinsic capacitances of the high-side and low side transistors 132, 134—is charged to the input dc voltage Vin. For the reasons previously described, when the high-side transistor 132 switches off at the falling edge of the control signal Vch, the input resonant network 110 is still sinking the current Ir—i.e., the direction of the current Ir is inward the input resonant network 110, as illustrated in FIG. 1 by means of the arrow identified with the reference 170.

As a consequence, the current Ir flows trough the capacitor 144 and the inductor 146, for reaching the reference node 131 through the inductor 148 and the primary winding 152. Having the current Ic in said direction, electric charge is removed from the "plate" of the capacitor Cp connected to the circuit node 138. Thus, if the guard interval Td is sufficiently long, the voltage of the circuit node 138 decreases until it is clamped by the body diode 142 to (approximately) the ground voltage.

Therefore, at the rising edge of the control signal Vcl, the low-side transistor 134 is able to switch in a ZVS condition, with a nearly zero drain to source voltage.

Similarly, when the low-side transistor 134 switches off at the falling edge of the control signal Vcl, the input resonant network 110 is still sourcing the current Ir—i.e., the direction of the current Ir is outward from the input resonant network 110, as illustrated in FIG. 1 by means of the arrow identified with the reference 180.

Having the current Ic in said direction, electric charge is added to the "plate" of the capacitor Cp connected to the circuit node 138. Thus, if the guard interval Td is sufficiently long, the voltage of the circuit node 138 increases until it is clamped by the body diode 140 to (approximately) the input dc voltage Vin.

Therefore, at the rising edge of the control signal Vch, the high-side transistor 132 is able to switch in a ZVS condition, with a nearly zero drain to source voltage.

Figure 3:
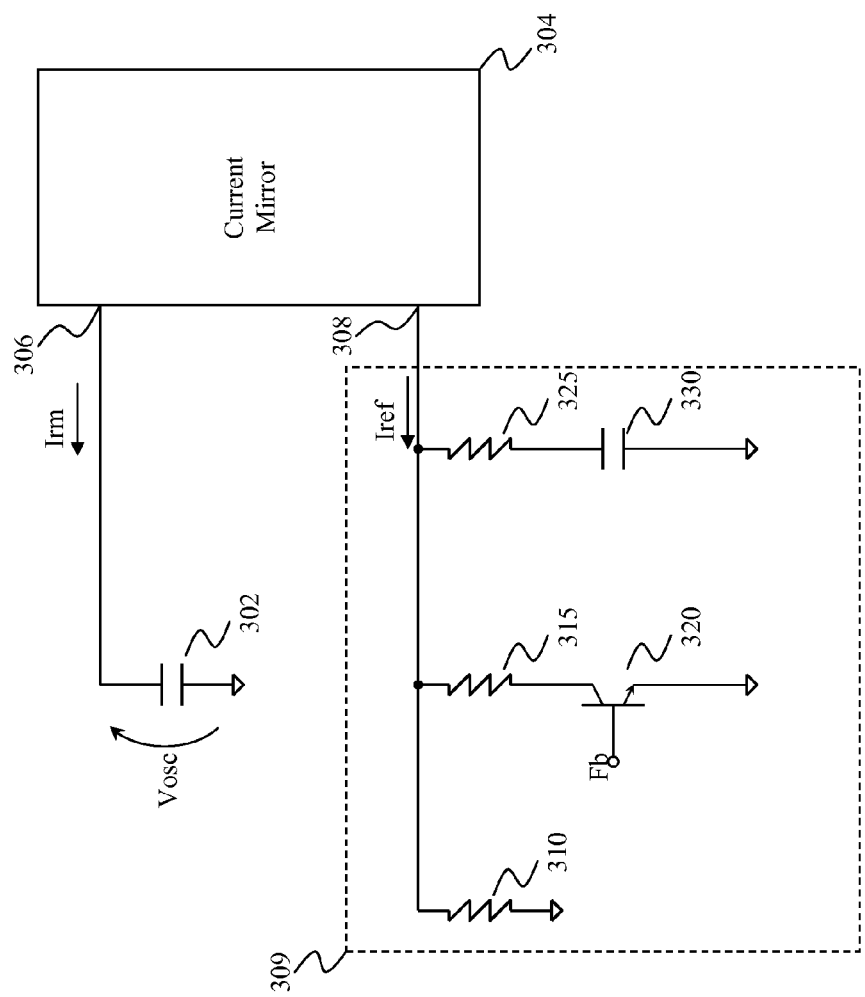
FIG. 3 illustrates the main components of a switching control circuit according to an exemplary solution known in the art.

Making reference to FIG. 3, the main components of a switching control circuit are schematically illustrated according to an exemplary solution known in the art.

Figure 4:
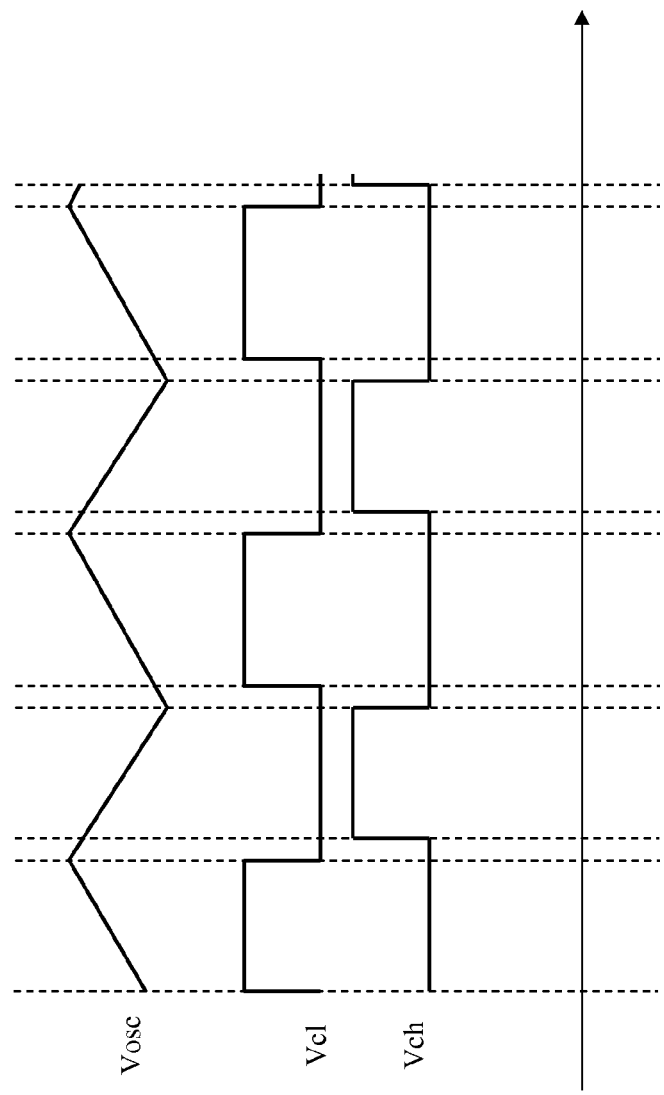
FIG. 4 illustrates an example of how some signals of the converter of FIG. 1 and of the switching control circuit of FIG. 3 evolve in time.

The control signals Vch and Vcl are generated by the known switching control circuit exploiting the voltage drop Vosc that develops across the terminals of a capacitor 302 when it is charged/discharged by means of a constant charging current Irm. Particularly, the capacitor 302 is alternately charged/discharged by alternately changing the direction of the charging current Irm, in such a way that the voltage drop Vosc developed across the capacitor 302 is a periodic triangle wave; such triangle wave is used as a basis for generating the control signals Vch, Vcl. Particularly, as it is shown in FIG. 4, during the rising ramps of the voltage drop Vosc the control signal Vch is set to the low value, while the control signal Vcl is set to the high value; conversely, during the falling ramps of the voltage drop Vosc, the control signal Vch is set to the high value, while the control signal Vcl is set to the low value. For example, the control signal Vcl and Vch may be generated by comparator circuits (not shown in the figures) through the comparison of the voltage drop Vosc with respective threshold voltages. For generating the guard intervals Td after each falling edge of the control signal Vcl and Vch, the output of said comparators may be delayed with proper delay elements.

Referring back to FIG. 3, the known control circuit includes a controlled current mirror unit 304 having a first terminal 306 coupled to the capacitor 302 for providing the charging current Irm and a second terminal 308 for receiving a reference current Iref. The value of the charging current Irm is set by the controlled current mirror unit 304 to the same value of the reference current Iref. Moreover, in order to allow the voltage drop Vosc to follow a periodic triangular waveform, the direction of said charging current Irm is periodically reversed by the controlled current mirror unit 304. When the charging current Irm is sourced to the capacitor 302 by the controlled current mirror unit 304, the voltage drop Vosc linearly increases with a slope determined by the charging current Irm value. Similarly, when the charging current Irm is sunk from the capacitor 302 by the controlled current mirror unit 304, the voltage drop Vosc linearly decreases with a slope determined by the charging current Irm value.

Therefore, by varying the reference current Iref, it is possible to vary the speed with which the capacitor 302 is charged/discharged, and thus the periods of the periodic control signal Vcl and Vch. More particularly, the higher the reference current Iref, the higher the slope of the rising/falling edges of the voltage drop Vosc. Moreover, the higher the slope of the rising/falling edges of the voltage drop Vosc, the shorter the periods of the control signal Vcl and Vch. In other words, the switching frequency sf the control signals Vch and Vcl is directly proportional to the value of the reference current Iref.

The second terminal 308 of the controlled current mirror unit 304 is kept to a substantially constant voltage, in such a way that the value of the reference current Iref can be easily tuned by varying the resistance seen by the current mirror unit 304 through the second terminal 308 itself.

For this purpose, the second terminal 308 may be connected to a variable-resistance network—identified in FIG. 3 with the reference 309. In the example considered, the network 309 comprises a resistor 310 having a terminal connected to the second terminal 308 of the controlled current mirror 304 and the other terminal receiving the ground voltage; moreover, the network 309 comprises a further resistor 315 having a terminal connected to the second terminal 308 of the controlled current mirror 304 and the other terminal connected to a collector of a transistor 320. The transistor 320 has an emitter receiving the ground voltage, and a base terminal for receiving a feedback signal Fb indicative of the value of the output dc voltage Vout generated by a known converter identical to the converter 100 except that the known converter employs the known switching control circuit of FIG. 3.

For example, the feedback signal Fb may be directly proportional to the output dc voltage Vout. Based on the value of the feedback signal Fb, the transistor 320 sets the current drained thereby, varying the total resistance of the network 309. In case the feedback signal Fb is so low that the transistor 320 is off, the resistance of the network 309 is entirely determined by the resistor 310. When the feedback signal Fb rises, the transistor 320 turns on, increasing the value of the reference current Iref (and of the switching frequency sf).

Since at the power on of the known converter the output dc voltage Vout is equal to the ground voltage, the value of the reference current Iref is at its minimum value, determined by the resistance of the resistor 310 only. In this condition, the switching frequency sf is very low; therefore, the energy transferred from the primary winding 152 to the secondary winding 154 of the transformer 115 during each period of the square input voltage Vsq is very high, and the output dc voltage Vout is increased.

As the output voltage Vout rises, the transistor 320 turns on, increasing the value of the reference current Iref. In this way, the switching frequency sf is raised, and the amount of energy transferred from the primary winding 152 to the secondary winding 154 per period decreases.

In order to allow the known converter to perform a soft start, the network 309 may be provided with a further resistor 325 coupled between the second terminal 308 of the controlled current mirror 304 and a capacitor 330. Since at the power on of the known converter the capacitor 330 is discharged, the value of the reference current Iref is initially determined by the resistance of the parallel connected resistors 310, 325. In this way, the value of the reference current Iref (and the corresponding value of the switching frequency sf) is increased. With the passage of time, the reference current Iref charges the capacitor 330, and the resistance contribution due to the resistor 325 diminishes. In this way, the switching frequency sf is progressively reduced.

As previously mentioned, when the known converter is in the steady state the voltage across the capacitor 144 comprises a dc component—corresponding to about half the input dc voltage Vin—and an ac component that follows the course in time of the square input voltage Vsq. Since the capacitor 144 blocks the dc component of such voltage, the voltage developed across the primary winding 152 of the transformer 115 comprises an ac component only; as a consequence, in the steady state, the value of the magnetic flux linking the primary winding 152 with the secondary winding 154 oscillates within a symmetrical range defined by such ac component only.

On the contrary, at the start up of the known converter, the capacitor 144 is discharged; thus, when the high-side transistor 132 switches on for the first time (first rising edge of the control signal Vch), the voltage seen by the primary winding 152 increases by a great amount. As a consequence, the transformer 115 operates in the flux doubling condition, with the magnetic flux that oscillates within a (relatively high) non-symmetrical range, causing a temporary asymmetry in the current Ir delivered/drained by the input resonant network 110.

Particularly, since at the start up the capacitor 144 is completely discharged, when the high-side transistor 132 is turned on the current Ir flowing into the input resonant network 110 increases more rapidly than it decreases when the low-side transistor 134 is turned on.

Figure 5:
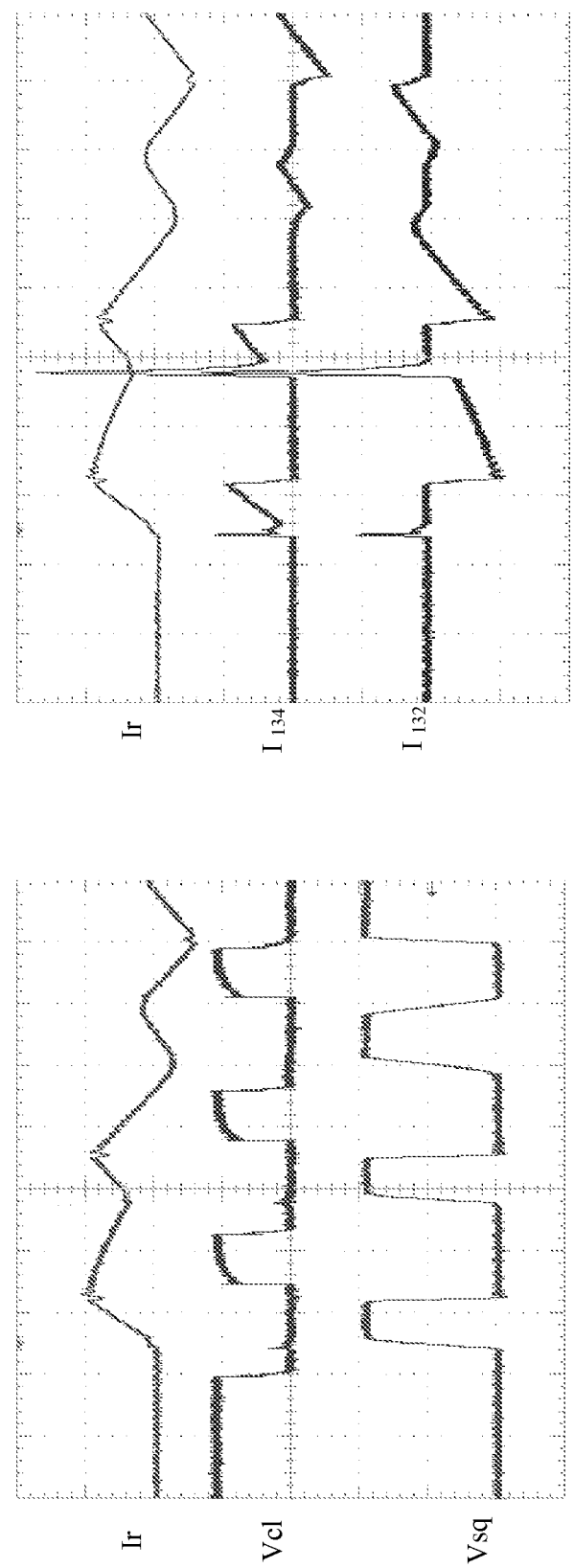
FIGS. 5A and 5B depict experimental results illustrating the behavior of some signals of the converter illustrated in FIG. 1 during the start up thereof.

FIGS. 5A and 5B depict experimental results illustrating the behavior of the current Ir during the start up of the known converter.

When the high-side transistor 132 is activated for the first time (first semi-period of the square input voltage Vsq), the circuit node 138 reaches a voltage approximately equal to the input dc voltage Vin. Being the capacitor 144 completely discharged, the voltage of the circuit node 138 is provided to the terminal of the inductor 146 connected to the capacitor 144, and the voltage of the circuit node 150 assumes a relatively high positive value. Therefore, the current Ir increases with a relatively high rate.

When the low-side transistor 134 turns on (second semi-period of the square input voltage Vsq), the circuit node 138 is brought to the ground voltage. At that moment, the capacitor 144 is storing a small amount of electric charge, collected during the previous semi-period of the square input voltage Vsq. Said small amount of electric charge develops a relatively small voltage difference across the terminals of the capacitor 144, with the terminal connected to the circuit node 138 that is at a higher potential than that of the terminal connected to the inductor 146. As a consequence, the voltage of the circuit node 150 assumes a negative value that is relatively low in absolute value. Therefore, the current Ir decreases with a relatively low rate, and particularly with a rate lower than the rate with which the current Ir has been increased during the previous semi-period of the square input voltage Vsq.

Therefore, as can be seen in FIG. 5A, when the low-side transistor 134 turns off at the falling edge of the control signal Vcl the current Ir is still positive, i.e., it is still drained by the input resonant network 110.

When the high-side transistors 132 is turned on again, the current Ir restarts to increase, but with a lower increasing rate compared to that of the previous period of the square input voltage Vsq. Indeed, the presence of residual charge that has been previously accumulated in the capacitor 144 causes the circuit node 150 to be brought to a value that is lower than in the previous period of the square input voltage Vsq.

Then, when the low-side transistor 134 is turned on again, the voltage developed across the terminals of the capacitor 144 is increased, because even more electrical charge has been stored therein. Therefore, the voltage of the circuit node 150 assumes a negative value which has a higher absolute value, and the current Ir decreases with a higher rate.

After a few number of periods of the square input voltage Vsq, the known converter enters in the steady state operation, with the capacitor 144 that stores a charge corresponding to a voltage difference of about half the input dc voltage Vin across its terminals, and the current Ir that symmetrically oscillates between a positive and a negative value.

As already mentioned in the previous, during the periods of the start up in which the high-side transistor 132 is turned on when the current Ir is still positive, the switching losses become really high, since the high-side transistor 132 has to perform a hard switching. This condition is illustrated in FIG. 5B, showing that the current drained by the high-side transistor 132—identified with the reference $I_{132}$,—exhibits a high spike when it is turned on with a positive current Ir. Indeed, in this condition the high-side transistors 132 has to provide more current for bringing the circuit node 138 to the input dc voltage Vin, because of the electric charge drained away through the body diode 142. Similar considerations apply for the current drained by the high-side transistor 134, identified in the figure with the reference $I_{134}$.

In order to avoid (or at least reduce) any occurrence of hard switching, the solution according to one embodiment of the present disclosure provides for dynamically varying the duty cycle of the control signals Vch and Vcl in such a way that the duty cycle of the control signal Vcl is higher than the duty cycle of the control signal Vch during at least a portion of the start up of the converter 100. For this purpose, according to an embodiment of the present disclosure the known switching control unit previously described with reference to FIG. 3 is properly modified to allow such duty cycle variation.

Figure 6:
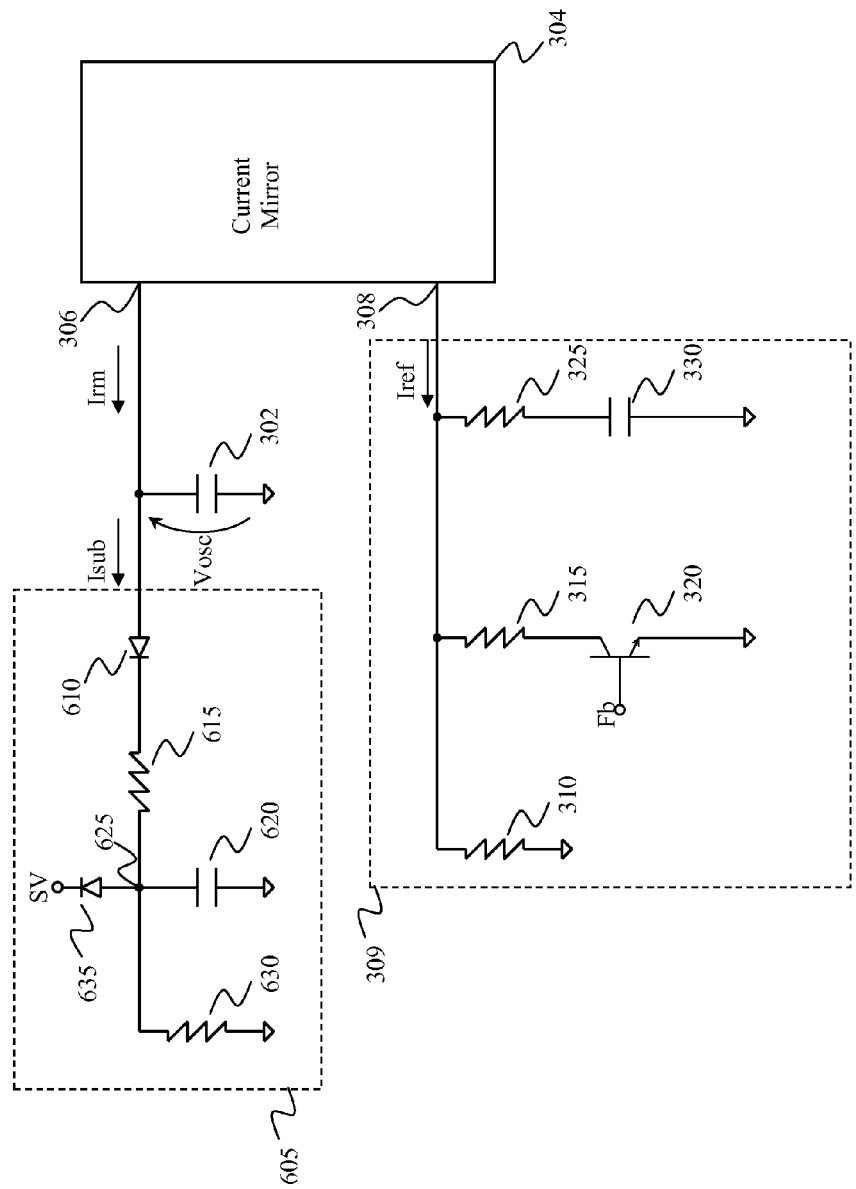
FIG. 6 illustrates the main components of the switching control circuit included in the converter of FIG. 1 according to one embodiment.

Making reference to FIG. 6, the main components of the switching control circuit 136 are schematically illustrated according to an embodiment of the present disclosure. The elements corresponding to those shown in the FIG. 3 are denoted with the same references, and their explanation is omitted for the sake of brevity.

Particularly, according to an embodiment of the present disclosure the switching control circuit 136 further includes a duty cycle control circuit 605 adapted to increase the duty cycle of the control signal Vcl during the start up operation of the converter 100.

The duty cycle control circuit 605 includes a diode 610 having the anode connected to the first terminal 306 of the controlled current mirror 304 and the cathode connected to a terminal of a resistor 615. The other terminal of the resistor 615 is connected to the a terminal of a capacitor 620 (circuit node 625); the other terminal of the capacitor 620 is connected to a terminal providing the ground voltage. A further resistor 630 is connected in parallel to the capacitor 620; particularly, the resistor 630 has a terminal connected to the circuit node 625 and another terminal connected to a terminal providing the ground voltage.

In principle, the duty cycle control circuit 605 is adapted to increase the charging time of the capacitor 302 with respect to that determined by the reference current Iref. Particularly, the charging time of the capacitor 302 is increased by exploiting the diode 610 for subtracting a portion Isub of the charging current Irm sourced by the controlled current mirror 304. Since the time during which the control signal Vcl is kept at the high value is directly proportional to the charging time of the capacitor 302 (i.e., to the duration of the voltage drop Vosc rising ramps), by increasing this time it is possible to increase the duty cycle of the control signal Vcl.

When the direction of the charging current Irm reverses in such a way that the latter is sunk by the controlled current mirror 304, the diode 610 turns off, Isub is equal to zero, and the discharging time of the capacitor 302 is left unchanged with respect to that determined by the reference current Iref. The purpose of the resistor 630 is to allow the capacitor 620 to discharge at the power off of the converter 100; in order not to interfere with the operation of the duty cycle control circuit 605 during the operation of the converter 100, the resistance of the resistor 630 is kept much higher than that of the resistor 615. In addition or in the place of the resistor 630, the capacitor 620 may be discharged at the power off of the converter 100 through a discharging diode 635 having the anode coupled with the capacitor 620 and the cathode receiving a supply voltage SV of the switching control circuit 136. When the converter 100 is on, the discharging diode 635 is reverse biased; as soon as the converter 100 is turned off, the supply voltage SV drops, forward biasing the discharging diode 635 and allowing the capacitor 620 to discharge therethrough.

The resistor 615 and the capacitor 620 form a first order RC network. Therefore, the current Isub progressively diminishes with the passage of time, and particularly with a time constant T equal to the product of the resistance of the resistor 615 with the capacitance of the capacitor 620. Since the value of the current Isub is directly related to the duty cycle of the control signal Vcl, with the arrangement illustrated in FIG. 6 the amount of the duty cycle increasing of the control signal Vcl progressively decreases with the passage of time.

Figures 7A, 7B:
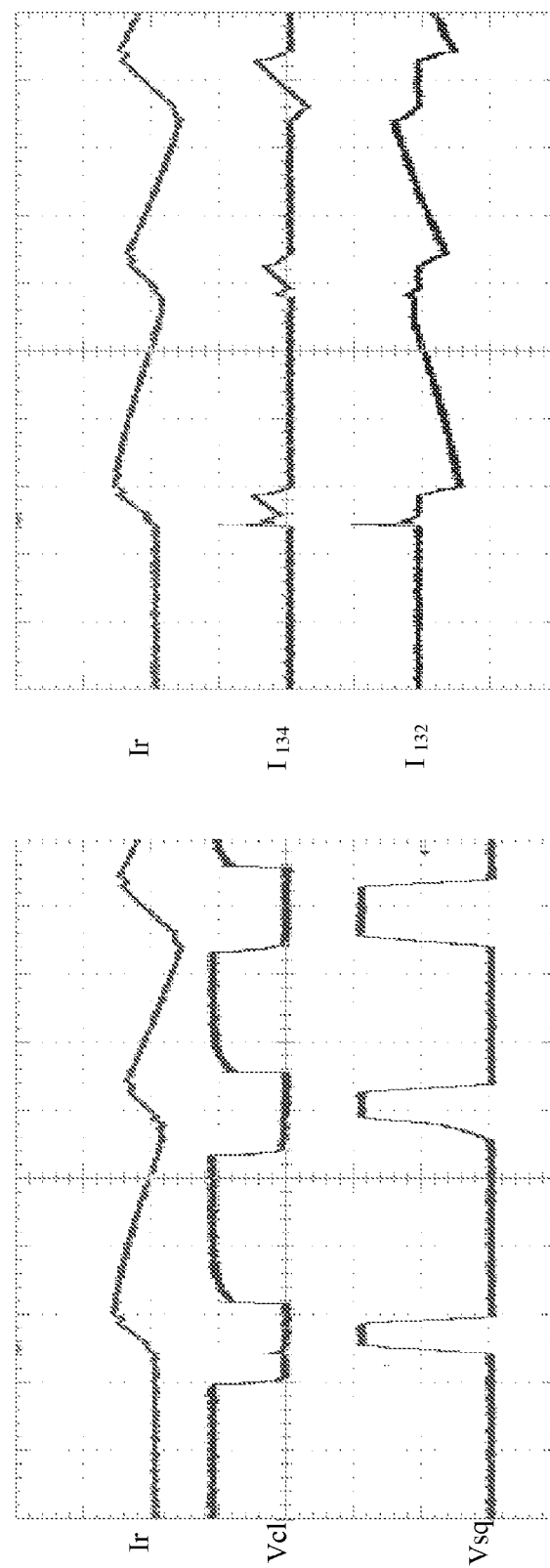
FIGS. 7A and 7B depict experimental results illustrating the behavior of some signals of the converter illustrated in FIG. 1 during the start up thereof when the switching control circuit is the one illustrated in FIG. 6.

FIGS. 7A and 7B depict experimental results illustrating the behavior of the current Ir during the start up of the converter 100 including the switching control circuit 136 of FIG. 6.

At the power on of the converter 100, the capacitor 620 of the duty cycle control circuit 605 is discharged, and the current Isub it is at a relatively high value. In this condition, the charging time of the capacitor 302 is increased, and the duty cycle of the control signal Vcl is decidedly higher than the duty cycle of the control signal Vch. In this way, the high-side transistor 132 is kept activated for a lower time with respect to the low-side transistor 134, and when the low-side transistor 134 is on the current Ir has sufficient time to reverse before the next activation of the high-side transistor 132, avoiding thus the occurrence of a hard switching. This can be clearly seen in FIG. 7B, wherein the second time the high-side transistor 132 is activated, no current spikes occurs.

With the passage of time, the current Isub diminishes, since the charge stored in the capacitor 620 of the duty cycle control circuit 605 increases. As a consequence, the duty cycle increasing of the control signal Vcl decreases, until the current diode 610 is off. In this condition, occurring after a period of time substantially equal to with a time constant T of the RC network defined by the resistor 615 and the capacitor 620, the duty cycle of the control signal Vcl equals the duty cycle of the control signal Vch.

Since the hard switching drawback affects the first few operating cycles of the converter 100 after its power on, the resistance of the resistor 615 and the capacitance of the capacitor 620 are chosen in such a way that the time constant T of the RC is higher than one period of the square input voltage Vsq. A good choice may provide for setting the time constant T to about 3-10 times the period of the square input voltage Vsq. Indeed, after this period of time, it is substantially assured that the capacitor 144 of the input resonant network 110 is sufficiently charged for avoiding the transformer 115 to operate in the flux doubling condition, and thus the transistors 132, 134 to switch in a hard switching condition.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A half bridge switching dc-dc converter for converting an input dc voltage to an output dc voltage, the converter comprising:
    a switching circuit configured to receive the input dc voltage and generate a periodic square wave voltage oscillating from a high value corresponding to the input dc voltage to a low value corresponding to a reference voltage and oscillating at a main frequency with a main duty cycle equal to about 50% when the converter operates in a steady state;
    a conversion circuit configured to generate the output dc voltage from the square wave voltage based on the main frequency and on the main duty cycle, the conversion circuit including a dc blocking capacitor configured to receive the square wave voltage, and
    a switching control circuit configured to control the switching circuit and temporarily vary the main duty cycle during at least one period of the square wave after a power on of the converter.

2. The converter of claim 1, wherein the switching circuit includes:

a first controlled switch coupled between a first terminal, configured to receive the input dc voltage, and a circuit node coupled with the dc blocking capacitor, and a second controlled switch coupled between a second terminal, configured to receive the reference voltage, and the circuit node, the switching control circuit being configured to alternatively activate the first controlled switch and the second controlled switch in such a way that the square wave is delivered by the switching circuit to the circuit node.

3. The converter of claim 2, wherein:

the switching control circuit comprises means for generating a first control signal periodically oscillating between a first high value and a first low value at the main frequency with the main duty cycle;

the switching control circuit comprises means for generating a second control signal periodically oscillating between a second high value and a second low value at the main frequency with a secondary duty cycle, the first and the second control signals being in antiphase;

the first controlled switch is configured to be activated when the first control signal is at the first high value and is configured to be turned off when the first control signal is at the first low value, and the second controlled switch is configured to be activated when the second control signal is at the second high value and is configured to be turned off when the second control signal is at the second low value.

4. The converter of claim 3, wherein the switching control circuit comprises means for increasing the secondary duty cycle to cause the secondary duty cycle to be higher than the main duty cycle by a variable amount during at least one period of the square wave after the power on of the converter.

5. The converter of claim 4, wherein the switching control circuit includes means for progressively decreasing said variable amount until the secondary duty cycle is equal to about 50% at the steady state of the converter.

6. The converter of claim 5, wherein the switching control circuit comprises a reference capacitor, the main duty cycle and the secondary duty cycle depending on a voltage that develops across the reference capacitor.

7. The converter of claim 6, wherein the main duty cycle is in inverse proportion to a current discharging the reference capacitor and the secondary duty cycle is in inverse proportion to a current charging the reference capacitor.

8. The converter of claim 7, wherein the switching circuit comprises a current generator circuit configured to provide to the reference capacitor a first current oscillating between a positive value for charging the reference capacitor and a negative value for discharging the reference capacitor.

9. The converter of claim 8, wherein the switching circuit further comprises a duty cycle control circuit configured to reduce the current charging the reference capacitor by a current amount when the first current is at the positive value during at least one period of the square wave after a power on of the converter.

10. The converter of claim 9, wherein the switching circuit includes means for decreasing said current amount until the secondary duty cycle is equal to about 50% at the steady state of the converter.

11. A switching control circuit for controlling a switching circuit of a half bridge switching dc-dc converter adapted to convert an input dc voltage to an output dc voltage, the switching circuit being configured to receive the input dc voltage and generate a periodic square wave voltage oscillating from a high value corresponding to the input dc voltage to a low value corresponding to a reference voltage, the periodic square wave voltage oscillating at a main frequency with a main duty cycle, the value of the main duty cycle being equal to about 50% when the converter operates in a steady state, the converter further including a conversion circuit configured to generate the output dc voltage from the square wave voltage based on the main frequency and on the main duty cycle, the conversion circuit including a dc blocking capacitor for receiving the square wave voltage, the switching control circuit comprising:

control means for controlling the switching circuit; and varying means for temporarily varying the main duty cycle during at least one period of the square wave after a power on of the converter.

12. The switching control circuit of claim 11, wherein the switching circuit includes:

a first controlled switch coupled between a terminal providing the input dc voltage and a circuit node coupled with the dc blocking capacitor, and a second controlled switch coupled between a terminal providing the reference voltage and the circuit node, the control means of the switching control circuit alternatively activating the first controlled switch and the second controlled switch in such a way the square wave is delivered by the switching circuit to the circuit node.

13. The switching control circuit of claim 12, wherein the control means includes:

means for generating a first control signal periodically oscillating between a first high value and a first low value at the main frequency with the main duty cycle, and means for generating a second control signal periodically oscillating between a second high value and a second low value at the main frequency with a secondary duty cycle, the first and the second control signals being in antiphase, wherein:

the first controlled switch is activated when the first control signal is at the first high value and is turned off when the first control signal is at the first low value, and the second controlled switch is activated when the second control signal is at the second high value and is turned off when the second control signal is at the second low value.

14. The switching control circuit of claim 13, wherein the varying means includes means for increasing the secondary duty cycle to cause the secondary duty cycle to be higher than the main duty cycle by a variable amount during at least one period of the square wave after a power on of the converter.

15. The switching control circuit of claim 14, wherein the varying means further includes means for progressively decreasing said variable amount until the secondary duty cycle is equal to about 50% at the steady state of the converter.

16. The switching control circuit of claim 15, wherein the control means includes a reference capacitor, the main duty cycle and the secondary duty cycle depending on the voltage that develops across the reference capacitor.

17. The switching control circuit of claim 16, wherein the main duty cycle is in inverse proportion to a current discharging the reference capacitor and the secondary duty cycle is in inverse proportion to a current charging the reference capacitor.

18. The switching control circuit of claim 17, wherein the control means includes a current generator circuit configured to provide to the reference capacitor a first current oscillating between a positive value for charging the reference capacitor and a negative value for discharging the reference capacitor.

19. The switching control circuit of claim 18, wherein the varying means includes a duty cycle control circuit configured to reduce the current charging the reference capacitor by a current amount when the first current is at the positive value during at least one period of the square wave after a power on of the converter.

20. The switching control circuit of claim 19, wherein the varying means includes means for decreasing said current amount until the secondary duty cycle is equal to about 50% at the steady state of the converter.

21. A method for operating a half bridge switching dc-dc converter adapted to convert an input dc voltage to an output dc voltage, the method comprising:
generating a periodic square wave voltage oscillating from a high value corresponding to the input dc voltage to a low value corresponding to a reference voltage, the periodic square wave voltage oscillating at a main frequency with a main duty cycle, the value of the main duty cycle being equal to about 50% when the converter operates in a steady state;
generating the output dc voltage from the square wave voltage based on the main frequency and on the main duty cycle by exploiting a conversion circuit that includes a dc blocking capacitor configured to receive the square wave voltage; and
temporarily varying the main duty cycle during at least one period of the square wave after a power on of the converter.

22. The method of claim 21, wherein the converter further includes:
a first controlled switch coupled between a terminal providing the input dc voltage and a circuit node coupled with the dc blocking capacitor, and
a second controlled switch coupled between a terminal providing the reference voltage and the circuit node, the method provides for alternatively activating the first controlled switch and the second controlled switch in such a way the square wave is delivered by the switching circuit to the circuit node.

23. The method of claim 22, further comprising:
generating a first control signal periodically oscillating between a first high value and a first low value at the main frequency with the main duty cycle;
generating a second control signal periodically oscillating between a second high value and a second low value at the main frequency with a secondary duty cycle, the first and the second control signals being in antiphase;
activating the first controlled switch when the first control signal is at the first high value and turning off the first controlled switch when the first control signal is at the first low value, and
activating the second controlled switch when the second control signal is at the second high value and turning off the second controlled switch when the second control signal is at the second low value.

24. The method of claim 23, further comprising:
increasing the secondary duty cycle to cause the secondary duty cycle to be higher than the main duty cycle by a variable amount during at least one period of the square wave after a power on of the converter.

25. The method of claim 24, further comprising progressively decreasing said variable amount until the secondary duty cycle is equal to about 50% at the steady state of the converter.

26. The method of claim 25, further comprising setting the main duty cycle and the secondary duty cycle based on the voltage that develops across a reference capacitor.

27. The method of claim 26, wherein the main duty cycle is in inverse proportion to a current discharging the reference capacitor and the secondary duty cycle is in inverse proportion to a current charging the reference capacitor.

28. The method of claim 27, further comprising providing a first current to the reference capacitor, the first current oscillating between a positive value for charging the reference capacitor and a negative value for discharging the reference capacitor.

29. The method of claim 28, further comprising reducing the current charging the reference capacitor by a current amount when the first current is at the positive value during at least one period of the square wave after a power on of the converter.

30. The method of claim 29, further comprising decreasing said current amount until the secondary duty cycle is equal to about 50% at the steady state of the converter.

31. The converter of claim 1, wherein:
the switching circuit includes:
a first controlled switch coupled between a first terminal, configured to receive the input dc voltage, and a circuit node coupled with the dc blocking capacitor; and
a second controlled switch coupled between a second terminal, configured to receive the reference voltage, and the circuit node; and
the switching control circuit is configured to control the first controlled switch with a first control signal having a first duty cycle corresponding to the main duty cycle, control the second controlled switch with a second control signal having a second duty cycle, and temporarily cause the second duty cycle to be higher than the first duty cycle by a variable amount during at least one period of the square wave after the power on of the converter.

* * * * *